Aug. 4, 1953  J. M. AUFIERO  2,647,451
AUTOMOBILE HEATER
Filed July 30, 1949  2 Sheets-Sheet 1
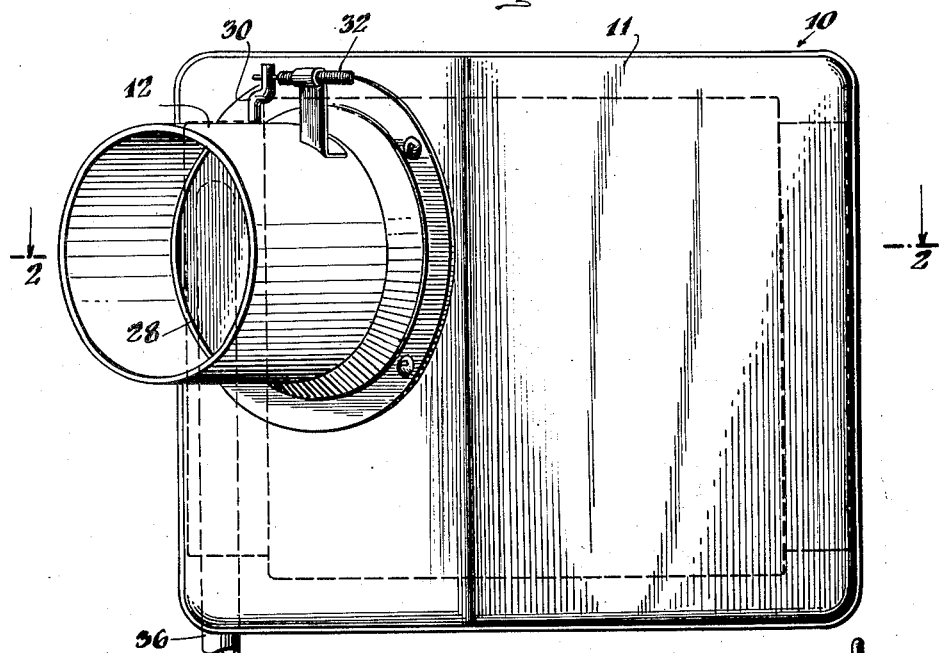
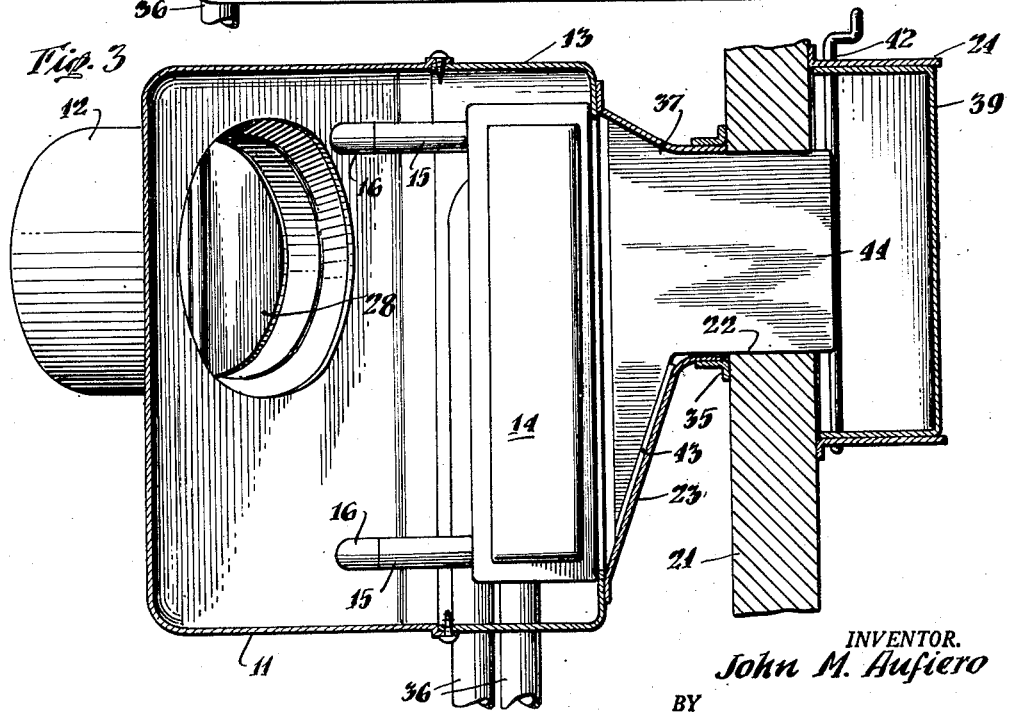
INVENTOR.
John M. Aufiero
BY
Duell and Kane
ATTORNEYS Aug. 4, 1953

J. M. AUFIERO 2,647,451

AUTOMOBILE HEATER

Filed July 30, 1949

INVENTOR.
John M. Aufiero
BY
Duell and Kane
ATTORNEYS

Patented Aug. 4, 1953

2,647,451

UNITED STATES PATENT OFFICE 2,647,451

AUTOMOBILE HEATER

John M. Aufiero, Plandome, N. Y., assignor to E. A. Laboratories, Inc., Brooklyn, N. Y., a corporation of New York Application July 30, 1949, Serial No. 107,739

4 Claims. (Cl. 98—2)

This invention relates to automobile heaters and more particularly to automobile heaters having an air intake outside of the passenger compartment of the automobile.

It is an object of this invention to provide a heater in which the air to be heated may be drawn either from outside the passenger compartment or from within the passenger compartment or from both sources simultaneously.

It is another object of this invention to provide a heater in which the bulk of the heating apparatus is placed in the engine compartment with a minor portion in the passenger compartment.

It is a further object of this invention to provide a heater in which a blower positioned in the passenger compartment draws air to be heated from the passenger compartment through a heater core outside of the passenger compartment.

It is another object of this invention to provide a control of the air recirculated from the passenger compartment which will not hinder the supply of air from outside the passenger compartment.

Among additional objects of this invention are those of providing a vehicle heater the controls of which may readily be adjusted by an inexperienced person to assure satisfactory operation of the apparatus and in which such adjustment the air may be either circulated as described or partially or wholly recirculated.

Still another object is that of designing a unit of this type which will include relatively few parts each individually simple and rugged in construction and capable of manufacture by quantity production methods, such parts when assembled operating over long periods of time with freedom from all difficulties.

With these and other objects in mind reference is had to the attached sheet of drawings illustrating practical embodiments of the invention and in which:

Fig. 1 is a front elevation of a heater according to this invention viewed from its engine compartment side;

Fig. 3 is a vertical section of the heater taken on line 3—3 of Fig. 2 in the direction of the arrows.

Figure 2:
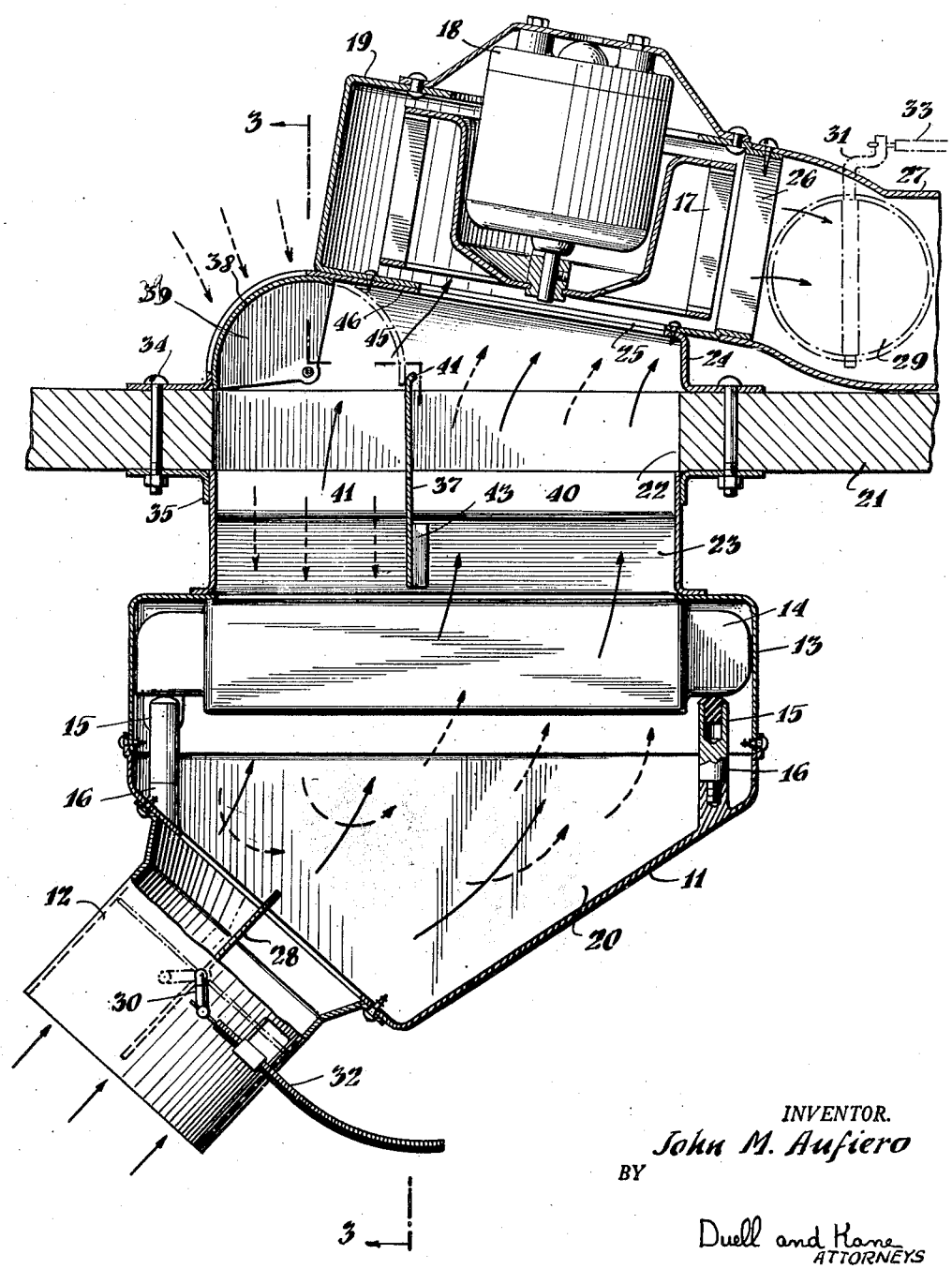
Fig. 2 is a horizontal section of the heater of this invention taken on line 2—2 of Fig. 1 in the direction of the arrows.

The heater of this invention is shown in Fig. 1 as it would be seen from the front. The heater 10 has a casing 11 which carries a duct 12. The duct 12 is connected to a suitable fresh air intake by a suitable air conduit (not shown). As is seen in Fig. 2, the casing 11 has a detachable rear portion 13. The rear portion 13 contains a heater core 14 which is positioned to abut against the rear wall of the rear portion 13, and is held in position by studs 15 which are supported on bases 16 in the casing 11. A blower fan 17 driven by a motor 18 and encased in a casing 19 is adapted to draw air through the duct 12 into a chamber 20 formed by the housing 11 and thence through the heater core 14. A fire wall 21 in the automobile in which the heater is mounted has an aperture 22. A duct 23 funnels the draft of heated air from core 14 to the aperture 22. The air flow is drawn through the aperture 22 by the blower fan 17 and continues through a housing 24 and into the casing 19 through an aperture 25. The air is expelled through a neck 26 into a distributing duct 27. From the distributing duct 27 the heated air is directed to provide heat at various desired points depending upon the exercise of suitable controls.

The flow of air through duct 12, chamber 20, core 14, duct 23, aperture 22, housing 24, aperture 25 and housing 19 to duct 27 is controlled by a butterfly valve 28. The flow of heated air from the duct 27 to the defroster tubes (not shown) is also controlled by a butterfly valve 29, shown in Fig. 2 in dotted outline. The butterfly valves 28 and 29 are regulated by crank levers 30 and 31 respectively which in turn are controlled by sections of Bowden wire 32 and 33 respectively. The heater 10 is bolted to the fire wall 21 by bolts 34 which clamp the housing 24 to the fire wall on one side and a flanged ring 35 on the other side. The core unit of the heater on the engine compartment side is held in place on the fire wall 21 by attachment to the flanged ring 35. Referring to Fig. 3, water conduits 36 are shown which provide the flow of heated water through the core 14, either of these pipes being an intake and the other an outlet. The heated water for the core is supplied through the conduits 36 from the cooling water of the automobile engine. The flow of this water through the conduits 36 may be controlled by a valve or thermostat (not shown) to provide a variation in the heating of the air that passes through the core 14.

Referring further to Fig. 3, a partition 37 is shown extending from adjacent the heater core 14 through the funnel-shaped duct 23 and the aperture 22 into the housing 24. The partition serves to divide the air passageway of the combination of the duct 23 and aperture 22 into two separate passages, 40 on the right side and 41 on the left side. As seen from above, in the horizontal section of Fig. 2, the left passage 41 is narrower in section than the right passage 40. The housing 24 has a port 38 in its left side as seen in Fig. 2. The contour of the casing 24 in the vicinity of the port 38 is rounded. A rotary louver valve 39 cooperating with this curved contour of the casing 24 provides means for opening and closing the port 38. As shown in Fig. 3, the rotary valve 39 is pivoted on a crank lever 42 which provides a control for opening and closing the rotary valve 39. The partition 37 has a lip 43, which abutting against the wall of the duct 23, provides an air-tight contact. Similarly, the rear edge 44 of the partition 37 which extends into the housing 24 is flared to receive in abutment the rotary valve 39 in its clockwise or open position. When the rotary valve 39 is in its counterclockwise or closed position a port 45 is formed between the edge 44 of the partition 37 and the rear wall 46 of the housing 24. This port 45 connects passage 41 with aperture 25 so that when the valve 39 is in closed position air is drawn into casing 19 through both right passage 40 and left passage 41.

As a consequence of the foregoing structure, the heater 10 when mounted in an automobile can be used to distribute heated air fresh from outside of the automobile or heated air recirculated from within the automobile, each to the exclusion of the other. In addition, the valves 28 and 39 may be adjusted to draw simultaneously both recirculated and fresh air through the core 14 for heating. The fresh air flow is provided by opening butterfly valve 28 and rotating fan 17 to create a draft of air through the duct 12, the chamber 20, the core 14 and into the casing 19 and out through the duct 27. This flow of air is represented in Fig. 2 by the solid arrows. With the rotary valve 39 in a closed position this flow of air after heating by core 14 passes on both sides of partition 37 utilizing port 45. The partition 37 provides essentially no obstruction to this passage of air and the heating and distribution of the air brought in from the outside in this manner is essentially the same as if there were no provision in heater 10 for heating air recirculated from the passanger compartment. The total flow of this air into the heater may be controlled by varying the degree of opening of the butterfly valve 28. This control is obtained through the crank lever 30 and the Bowden wire 32 which is made suitably accessible to the operator of the heater. The distribution of the heated air from the duct 27 is also suitably controlled such as by the defroster control valve 29 with its crank lever 31 and Bowden wire 33.

When it is desired to reheat or recirculate the air in the passenger compartment of the heated automobile the rotary valve 39 may be rotated in a clockwise direction from the closed position shown in full lines in Fig. 2 toward a fully open position shown in dotted lines in Fig. 2. This clockwise rotation of the valve 39 slowly closes the port 45 in the housing 24 while it correspondingly opens the port 38 in the housing 24. By thus shifting the valve 39 two changes are obtained. Air is drawn into the heater through port 38 from the passenger compartment and at the same time the passage of heated air through the port 45 from passage 41 is reduced. The operation of heater 10 with both valves 28 and 39 open is shown in the figures. When the rotary valve 39 has been rotated a sufficient distance the larger cross-section of the passage 40 plus the influx of air from the passenger compartment through port 38 will cause the fresh air entering from duct 12 to flow entirely through passage 40. At the same time the recirculated air from the passenger compartment will be drawn through the passage 41 in a reverse or downward direction as shown by the dashed arrows of Fig. 2. The partition 37 extends sufficiently close to the heater core 14 to cause this recirculated air to be drawn through the heater core 14 and into the chamber 20. The chamber 20 acts as a mixing chamber where the recirculated air from the back draft through open port 38 and passage 41 mixes with the front draft of fresh unheated air from duct 12. The recirculated air at this point swings around and joins the draft of fresh air mixing with it and passing through the right side of core 14 as seen in Fig. 2 and the passage 41 goes through the fan 17 in casing 19 and into the duct 27 from whence it is distributed through the passenger compartment. In this way the recirculated air is heated and mixed with the fresh air when both valves 28 and 39 are open or partially open.

This heater may also be operated with the valve 28 completely closed or almost so and the valve 39 open. In this position the recirculated air follows the same path as described above. Instead of mixing with fresh air the recirculated air shown by the dotted arrows merely swings around in the chamber 20 and following the path described by the dashed arrows passes through the fan 17 and into the duct 27.

The relative cross-sectional areas of passages 40 and 41 allow the fan to draw the recirculated air through the system of this heater with the valve 28 closed without overloading. This is achieved by the positioning of the partition 37 with relation to the heater core 14 and the port 39. The cooperation of the rotary valve 39 with the lip edge 44 of the partition 37 also serves to assist in providing an efficient recirculation of air with the circulation of fresh air completely cut off. As shown in Fig. 3, the lip edge 44 projects through the aperture 22 and the fire wall 21 and into the housing 24. The rotary valve 39 in moving to its fully open recirculation position overlaps the projecting lip edge and is adjacent or contiguous with the rear wall 46 to effectively close the port 45. With the valve 39 in this position and the port 45 fully closed, the recirculated air is almost all drawn through the heater core twice. This means that if the butterfly valve 28 is closed the recirculated air which is the only air passing through the system, is subjected to double heating which is efficient in providing heat in the passenger compartment of the automobile.

Thus among other advantages of the apparatus of this invention is the increased contact of the recirculated air with the heating core. Another advantage of this invention is the mixing chamber which has a dual purpose. The mixing chamber has the advantage of providing an area in which the recirculated air having passed through the heating core once can turn around and pass through the heating core a second time, with all the attendant advantages. The mixing chamber also has the advantage of providing a space in which the recirculated air and the fresh air can be blended together. The latter condition of course prevails only when both fresh air and recirculated air are being fed through the core. At the same time the mixing chamber in no way interferes with the flow of fresh air through the apparatus when recirculated air is not being passed through the core.

Further advantages of the arrangement of the apparatus of this invention is the pressure differential obtained by the positioning of the partition 37. The partition is positioned so that it is not at the center of the passageway through the fire wall but is set slightly to one side of the vertical center. Therefore, there are two passages formed by this partition, one of which has a greater horizontal dimension than the other. When the passage of fresh air through the smaller of these two passages is blocked by the rotary valve a back draft is set up from the passenger compartment through the smaller passage and countercurrent to the draft of fresh air through the larger side. The resultant advantages to this arrangement are manifold. One of the most salient advantages is that in this way the recirculation may be affected within the envelope of one heating structure rather than setting out the recirculation as a separate feature. Combined with this advantage is the further advantage obtained from the opening up of the small passage directly to the blower fan when the recirculation feature is not being utilized. This opening up permits an easier access of a larger flow of air to the blower fan with consequent efficiency in operation.

Thus, among others, the several objects of the invention as specifically aforenoted are accomplished. Obviously numerous changes in construction and rearrangement of the parts might be resorted to without departing from the spirit of the invention as defined by the claims.

I claim:

1. An automobile heater assembly including in combination a first casing; a core in said first casing; means coupling said core to the water cooling system of said automobile; an inlet opening in said casing and an outlet opening in said casing; a second casing; a motor driven air impelling means in said second casing; an inlet opening in said second casing; a duct extending between and connecting said outlet opening of said first casing and said inlet opening of said second casing; a partition wall extending from said core through said duct toward said second casing terminating adjacent to but spaced from said second casing; a passage in said duct between said partition and said second casing; and inlet opening in said duct adjacent to and spaced from said passage; and means in said duct for closing said duct inlet, said means being movable to open said duct inlet and close said passage whereby the direction of flow of air through a portion of said core is determined by the positioning of said opening and closing means.

2. A heater assembly as claimed in claim 1 having a pivoted door in said duct for closing said duct inlet rotatable to open said duct inlet and close said passage.

3. An automobile heater assembly mounted around an opening in a fire wall between the passenger and engine compartments of an automobile including in combination a first casing in said engine compartment formed with an opening adjacent and entering into said fire wall opening; an inlet opening in said first casing; a core in said first casing; means coupling said core to the water cooling system of said automobile; a second casing in said passenger compartment formed with an inlet opening and an outlet opening; a motor driven air impelling means in said second casing; a duct extending from said outlet opening of said first casing through said fire wall opening to said inlet opening of said second casing; a partition wall extending through said duct from said core and terminating adjacent to but spaced from said second casing; a passage in said duct between said partition and said second casing; an inlet in said duct adjacent said passage; a first valve at the inlet opening of said first casing; and a second valve means in said duct positionable to close and open said inlet in said duct and to close and open said passage.

4. An automobile heater assembly mounted around an opening in a fire wall between the passenger and engine compartments of an automobile including in combination a core casing in said engine compartment formed with an opening adjacent and entering into said fire wall opening; an inlet opening in said core casing; a core in said core casing; means coupling said core to the water cooling system of said automobile; an air distributing means comprising a fan casing an a housing for mounting said air distributing means in said passenger compartment; a first inlet opening in said air distributing means connecting with said fire wall opening; a motor driven air impelling means in said fan casing; a partition wall extending through said fire wall opening and into said air distributing means and terminating adjacent to but spaced from said fan casing; a passage in said air distributing means between said partition and said fan casing; a second inlet in said air distributing means adjacent said passage; and means in said air distributing means for closing said second inlet, said means being movable to open said second inlet and close said passage whereby the direction of flow of air through a portion of said core is determined by the positioning of said opening and closing means.

JOHN M. AUFIERO.

References Cited in the file of this patent

UNITED STATES PATENTS

| Number | Name | Date |
|---|---|---|
| 2,213,016 | Perkins | Aug. 27, 1940 |
| 2,242,337 | Aufiero | May 20, 1941 |
| 2,342,901 | Schutt et al. | Feb. 29, 1944 |